United States Patent Office 3,726,873
Patented Apr. 10, 1973

3,726,873
QUINACRIDONE PIGMENT AND METHOD OF MAKING THE SAME
Kiyoshi Hashizume, Masahiro Shigemitsu, Iaso Kumano, Masayuki Miyatake, Hiromitsu Katsura, and Masahiro Oshima, Tokyo, Japan, assignors to Toyo Ink Manufacturing Co., Ltd., Tokyo, Japan
No Drawing. Continuation-in-part of abandoned application Ser. No. 769,720, Oct. 22, 1968. This application Nov. 4, 1971, Ser. No. 195,862
Claims priority, application Japan, Oct. 27, 1967, 42/68,806, 42/68,807
Int. Cl. C07d 39/00
U.S. Cl. 260—279 R                    1 Claim

ABSTRACT OF THE DISCLOSURE

A yellowish-red quinacridone pigment of a new and distinct crystalline structure.

CROSS REFERENCE TO RELATED APPLICATIONS

This application is a continuation-in-part of application Ser. No. 769,720, filed Oct. 22, 1968, now abandoned.

BACKGROUND OF THE INVENTION

The present invention relates to quinacridone pigments of a new and distinct crystalline structure. Quinacridone (red pigment) has the following structural formula:

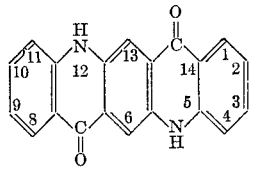

Quinacridones of the general class under consideration herein are known chemicals. Various different crystalline forms are disclosed in the art namely those of the α-type, β-type, γ-type, γ'-type, δ-type. The α- and γ-type pigments have a bluish-red color; the β-type a purple color, while the γ'- and δ-type have a slightly less bluish-red color than the γ-type. Thus, all these prior art pigments had a red color with a bluish shade. None had a red color with a yellowish shade. Endeavors to produce pigments having a yellowish-red color and having the relatively good resistance characteristics of quinacridone have so far not been successful.

SUMMARY OF THE INVENTION

It is, therefore, an object of the invention to provide a quinacridone pigment having a color tone differing from that of the known quinacridone pigments.

A more specific object of the invention is to provide a quinacridone pigment of a different color tone which has a high degree of fastness, a high resistance to light, heat, solvents and other chemical agents rendering it a superior pigment.

Still another object of the invention is to provide a new crystalline form of quinacridone.

Other objects will appear hereinafter.

The invention accordingly resides in a quinacridone pigment having a yellowish-red color shade and a crystalline form characterized by strong lines at the interplanar spacing of 14.03 A., 6.46 A. and 3.37 A. medium lines at 6.97 A. and 3.74 A. and weak lines at 5.31 A. and 4.37 A. when subjected to X-ray diffraction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

It has now been found that quinacridone pigments of different crystalline structures form different color shades which depend upon their crystalline form. In accordance with the invention a quinacridone having a novel crystalline form has been synthesized and shall be referred to hereinafter as the ε-type. This crystalline form has a yellowish-red color.

The new crystalline form has strong lines at the interplanar spacing of 14.03 A., 6.46 A. and 3.37 A., medium lines at 6.97 A. and 3.74 A. and weak lines at 5.31 A. and 4.37 A. when subjected to X-ray diffraction.

The most pronounced characteristic of the ε-type quinacridone pigment is its characteristic diffraction pattern particularly the interplanar spacing of 6.97 A. which differs materially from the hitherto known forms.

The following table sets out the interplanar spacing in (A.) of the ε-type of quinacridone as compared with the patterns of the quinacridones of the known crystalline form.

TABLE

X-ray diffraction band intensities [1] of quinacridone (A.)

| ε-Type | α-Type | β-Type | γ-Type | γ¹-Type | ε-Type |
|---|---|---|---|---|---|
| | | 15.23 (s) | | | 15.1 (w) |
| | 14.24 (s) | | | | |
| 14.03 (s) | | | | | |
| | | | 13.58 (s) | 13.58 (s) | 13.6 (s) |
| | | 7.55 (m) | | | |
| | 7.13 (m) | | | | |
| 6.97 (m) | | | | | |
| | | | 6.70 (m) | 6.75 (m) | 6.75 (m) |
| | | | | 6.85 (m) | 6.63 (m) |
| 6.46 (s) | | | 6.41 (s) | 6.46 (s) | 6.41 (s) |
| | 6.32 (m) | | | | |
| | | 5.47 (m) | | | |
| 5.31 (w) | 5.30 (m) | | 5.24 (m) | 5.21 (m) | 5.23 (w) |
| 4.37 (w) | | | 4.33 (w) | 4.33 (w) | 4.36 (w) |
| | 4.27 (w) | | | | 4.11 (w) |
| | | 4.06 (m) | | | |
| 3.74 (m) | | 3.75 (w) | 3.74 (m) | 3.74 (m) | 3.74 (m) |
| | 3.46 (s) | | 3.56 (w) | 3.56 (w) | 3.55 (m) |
| 3.37 (s) | | | 3.37 (s) | 2.37 (s) | 3.37 (s) |
| | | 3.31 (s) | | | 3.34 (s) |
| | 3.19 (s) | | | | |
| | | | | | 3.28 (w) |

[1] w=weak; m=medium; s=strong.

The ε-crystalline type of quinacridone pigment has the following color characteristics which were obtained by printing on art paper with a composition formed by mixing an ε-type quinacridone pigment in accordance with the invention and a conventional γ-type quinacridone pigment, with a resin-type varnish, for instance as further described in Example 3:

| | ε-Type quinacridone pigment | γ-Type quinacridone pigment |
|---|---|---|
| Dominant wave length, mμ | 494.8 | 495.7 |
| Brightness, percent | 25.7 | 24.7 |
| Purity, percent | 48.7 | 48.0 |

The outstanding property of the ε-type quinacridone pigment is the clear yellowish-red color which is not obtained with any of the quinacridones of the conventional crystalline form. The quinacridone of the invention, furthermore, has the same excellent lightfastness, heat resistance, heat and chemicals as the conventional quinacridone pigments. The invention produces new and unobvious results and a new pigment of a clear yellowish-red color having the high resistance to solvents and chemicals, lightfastness and heat resistance associated with the known quinacridone. The pigments and paint compositions of the invention therefore have great practical value.

The ε-type of quinacridone pigment in the invention may be produced as follows:

Quinacridone corresponding to the structural formula set out at column—lines— is ground into small pieces in an organic solvent which is inert with respect to quinacridone and its derivatives and in which the same are insoluble and brought in contact with a caustic alkali to produce an alkali salt, which is subsequently decomposed (dissociated) with water or alcohol. Any of the known crystalline forms of quinacridone can be used as the raw material in this process.

For the preparation of the alkali salt, various types of comminuting devices, such as a ball-mill or a vibrating-mill, may be used. Such mills are conventionally known as ball, pebble, rod, tube and compartment mills. These mills have a cylindrical or conical shell rotating on a horizontal axis and are charged with a grinding medium such as balls of steel, flint or porcelain or with steel rods. These mills have been described in detail in the Chemical Engineers' Handbook, John H. Perry, 4th ed. McGraw Company. The vibrating type of mill is also conventionally available and has been described in the same source and involves a mill in which ball action in a cylindrical shell results from oscillating or vibrating the shell. As the alkali, caustic soda or caustic potassium may be used in an amount of from 0.2:1 to 2:1 relative to the quinacridone. As organic solvents meeting the above recited requirements, O-nitrotoluene, nitrobenzene or chlorotoluene are suitable. They may be used in quantities amounting to from 4 to 26 times the amount of quinacridone. The decomposition of the alkali salt may be carried out with water or the conventional alcohols. The organic solvent is preferably thereafter removed by steam distillation or washing with methanol.

ε-Type quinacridone pigment has a high resistance to solvents and does not exhibit any changes in crystalline for even when heated in the usual organic solvents. It is, however, transformed to another crystalline form closer to the γ'-type crystalline form when it is dispersed in the form of fine particles in a polar solvent, such as nitrobenzene, followed by heating to a high temperature.

α-Type quinacridone and caustic soda are comminuted for example in nitrobenzene, the mixture poured into water, stirred for one hour and then allowed to stand, until ε-type quinacridone has formed and settled out at the bottom of the reaction container in the form of a paste of pigment finely dispersed in nitrobenzene. When, however, the resulting compound is heated for 10 hours at 135° C. for the purposes of dehydrating it, the resulting compound no longer has the characteristics of the ε-form unless nitrobenzene is first distilled off (as was done in Example 2 below). The X-ray diffraction diagram of the compound heated without distilling off the solvent is somewhat different from that of the ε-type and close to that of the γ'-type.

The ε-type quinacridone pigment obtained by the present invention can be used by itself or in admixture with other pigments to form coloring agents for various colored products. Due to its excellent lightfastness, heat resistance, resistance to solvents and chemicals, it may be used in admixture with various paints or for coloring plastics, dope-dyeing of fibers, resin printing inks, or in applications requiring color to be applied under harsh conditions. It will produce colored products of a striking yellowish-red color and having a high resistance to atmospheric and other attacks.

Thus for example, the ε-type of quinacridone pigment may be used in the production of the alkyd-melamine resin paints, acrylic resin printing inks, alkyd resin paints or nitrocellulose lacquers.

When it is used in styrene, acryl or vinyl acetate-type emulsion paints, a yellowish-red coating material having excellent resistance to influences of weather is obtained.

Due to its increases resistance and beautiful color shade, ε-type quinacridone can be used in the coloring of various plastics, such as polystyrene, polyethylene, polypropylene and polyvinylidene chloride providing plastics of a yellowish-red color which are not affected by heating.

Various molded materials made of polyvinyl chloride colored with ε-type quinacridone pigment likewise have a yellowish-red shade, good resistance to influence due to the weather and evidence freedom from migration.

The following examples illustrate the manner in which the ε-type of quinacridone can be prepared and employed as a pigment. All of the compositions described in the following examples evidenced a clear yellowish red color which was not heretofore obtainable.

EXAMPLE 1

Quinacridone obtained by subjecting 2,5-dianilino-terephthalic acid to a ring-closure reaction in a melt consisting of a mixture of aluminum chloride and phosphorus oxychloride was purified by fractionation with sulfuric acid to provide an α-type quinacridone. 5 g. of this α-type quinacridone, 100 g. of 100-mesh glass balls, 40 g. of chlorotoluene and 3.5 g. of caustic soda were then placed in a 200-ml. conventional vibrating mill. The mixture was shaken for 8 hours and poured into 200 ml. of water. After stirring for one hour, the chlorotoluene was eliminated by steam distillation and the glass balls removed. The resulting solution was subjected to filtration, washing with water and drying until an ε-type quinacridone pigment having a clear yellowish-red color was recovered.

EXAMPLE 2

2 kg. of steel balls of 3/16 in. size, 20 g. of an α-type quinacridone, 250 g. of nitrobenzene and 10 g. of caustic soda powder were placed in a 1-liter conventional ball-mill. The mixture was thoroughly mixed for 72 hours until a dark blue paste had been formed, which was poured into 2 l. of water and stirred for 30 minutes. Thereafter, the nitrobenzene was removed by steam distillation. The resulting residue was subjected to filtration, washing with water and drying. A clear yellowish-red ε-type quinacridone pigment was obtained.

EXAMPLE 3

Alkyd melamine baking paint:

| | G. |
|---|---|
| Soybean-oil modified alkyd resin (40% solids) | 50 |
| Xylene | 12 |

12 g. of the ε-type quinacridone pigment in accordance with the invention was added to the above components and the mixture subjected to dispersion in a generally available ball-mill. The following components were then added:

| | G. |
|---|---|
| Soybean-oil modified alkyd resin (40% solids) | 50 |
| Melamine-formaldehyde | 3.5 |
| Triethanolamine | 0.5 |
| Butanol | 5 |

This paint composition was coated onto a metal plate and the plate heated at 120° C. for one hour. A shiny surface having a clear yellowish-red color had formed on the metal.

A metal plate coated with the same paint but diluted five times with white paint, otherwise the same composition and subjected to heating did not show any decoloration when exposed to a Fadeometer for 1,000 hours.

EXAMPLE 4

Nitrocellulose lacquer:

| | G. |
|---|---|
| ½ second nitrocellulose | 20 |
| Dammar gum | 5 |
| Ethyl acetate | 10 |
| Butanol | 7 |
| Benzene | 28 |

6 g. of ε-type quinacridone was added to the solution obtained by mixing the above components and the mixture then dispersed in a ball-mill. The resulting mixture was coated onto a metal plate which was dried at room temperature providing a clear yellowish-red coated surface.

EXAMPLE 5

Alkyd paint drying at room temperature:

|   | G. |
|---|---|
| Safflower oil modified alkyd resin (oil length 65%) | 100 |
| Mineral spirits | 30 |

To a mixture of the above components, 10 g. of ε-type quinacridone was added and the mixture subjected to dispersion in a ball-mill. The resulting paint was mixed with 13 g. of cobalt naphthenaet and then coated onto a metal plate providing a clear yellowish-red coated surface having excellent weather resistance after air-drying at room temperature.

EXAMPLE 6

Acrylic waterpaint:

|   | G. |
|---|---|
| Safflower oil modified alkyl resin emulsion (solids 50%) (oil length 40%) | 30 |
| Polyoxyethyleneglycol alkylether ("HLB 15") | 15 |

15 g. of ε-type quinacridone pigment was added to a mixture of the above components and the mixture subjected to dispersion in a ball-mill of the conventional type. The following compounds were then added:

|   | G. |
|---|---|
| Rutile-type titanium oxide | 60 |
| Clay | 20 |
| Talc | 40 |
| Ethyleneglycol | 50 |
| Acrylic resin emulsion (solids: 50%) | 95 |
| Water | 40 |

The thusly formed paint was coated onto a metal plate, and the plate then subjected to drying at room temperature to provide a yellowish red surface.

EXAMPLE 7

Flexographic printing ink:

|   | G. |
|---|---|
| ε-Type quinacridone pigment | 15 |
| Rosin modified maleic acid resin (solids: 25%) | 45 |

A mixture of the above components was subjected to dispersion in a ball-mill and the following compounds were added:

|   | G. |
|---|---|
| Rosin modified maleic acid resin (solids: 25%) | 30 |
| Paraffin wax | 5 |
| Ethyleneglycol | 1 |

The mixture was thoroughly stirred to obtain a flexographic printing ink suited to give a lustrous yellowish-red printing surface having excellent friction and lightfastness.

EXAMPLE 8

Polyvinyl chloride base colored product:

|   | G. |
|---|---|
| Polyvinyl chloride | 100 |
| Dioctyl phthalate | 45 |
| Dibutyl tindilaurate | 3 |
| Cadmium stearate | 1 |

To the mixture of the above components 1 g. of ε-type quinacridone pigment was added. The mixture was then subjected to dispersion in a two roll mill at 150° C. to obtain a polyvinyl chloride sheet colored in a clear yellowish-red and having excellent migration resistance.

EXAMPLE 9

Polyethylene base colored product:

|   | G. |
|---|---|
| ε-Type quinacridone pigment | 40 |
| Zinc stearate | 40 |
| Cadmium stearate | 20 |

0.5 g. of this mixture was stirred sufficiently and 200 g. of polyethylene were carefully mixed in. The mixture was then passed through a kneader heated to 180° C. to obtain a clear colored polyethylene without showing any discoloration.

EXAMPLE 10

Polystyrene base colored material:

|   | G. |
|---|---|
| ε-Type quinacridone pigment | 40 |
| Aluminum stearate | 60 |

0.5 g. of the above mixture was shaken thoroughly and after mixing with 200 g. of polystyrene passed through a kneader heated to 160° C. to provide a polystyrene colored in a clear yellowish-red.

EXAMPLE 11

Polyvinylidene chloride base colored product:

|   | G. |
|---|---|
| ε-Type quinacridone pigment | 50 |
| Calcium stearate | 50 |

1 g. of the mixture formed from the above components was thoroughly shaken and then mixed with 100 g. of polyvinylidene chloride. The mixture was then subjected to melt spinning to provide a polyvinylidene chloride yarn colored in a clear yellowish-red.

EXAMPLE 12

Colored rubber composition:

|   | G. |
|---|---|
| Natural rubber | 100 |
| Calcium carbonate | 40 |
| Zinc oxide | 10 |
| Anatase-type titanium oxide | 10 |
| Sulfur | 3 |
| 2-mercaptobenzothiazol | 1.5 |
| Hexamethylenetetramine | 0.3 |

2 g. of ε-type quinacridone was added to a mixture prepared from the above components and the mixture thereafter subjected to dispersion in a ball mill of the conventional type and thereafter to pressure molding at 180° C. to provide a molded rubber product of a yellowish-red color. No change in color due to the pressure-molding was observed.

From the examples and the foregoing disclosure it can be seen that the ε-type quinacridone is prepared by grinding a comminuted quinacridone having a crystalline form other than ε-type together with alkali and an organic solvent, until quinacridone alkali salt is formed, adding the salt organic solvent mixture to an aqueous or alcoholic medium whereby the salt is dissociated, evaporating off the organic solvent and filtering, washing and drying the residue to provide the ε-type quinacridone.

What is claimed as new and desired to be protected by Letters Patent is set forth in the appended claim:

1. Quinacridone pigment having a yollowish-red color shade and a crystalline form characterized by strong lines at the interplanar spacing of 14.03 A., 6.46 A. and 3.37

A., medium lines 6.97 A. and 3.74 A. and weak lines at 5.31 A. and 4.37 A. when subjected to X-ray diffraction.

References Cited

UNITED STATES PATENTS

| 3,201,402 | 8/1965 | Bohler | 262—279 R |
| 3,272,821 | 9/1966 | Scitweizer | 260—279 R |
| 3,352,867 | 11/1967 | Adachi et al. | 260—279 R |

FOREIGN PATENTS

| 1,125,577 | 8/1968 | Great Britain | 260—279 R |

DONALD G. DAUS, Primary Examiner

U.S. Cl. X.R.

106—288 Q